United States Patent [19]

Whittingham

[11] 4,084,046
[45] Apr. 11, 1978

[54] RECHARGEABLE ELECTROCHEMICAL CELL WITH CATHODE OF STOICHIOMETRIC TITANIUM DISULFIDE

[75] Inventor: M. Stanley Whittingham, Fanwood, N.J.

[73] Assignee: Exxon Research & Engineering Co., Linden, N.J.

[21] Appl. No.: 667,607

[22] Filed: Mar. 17, 1976

Related U.S. Application Data

[62] Division of Ser. No. 575,994, May 9, 1975, Pat. No. 4,007,055.

[51] Int. Cl.$^2$ ............................................. H01M 6/14
[52] U.S. Cl. ................................... 429/194; 429/218
[58] Field of Search ............ 136/20, 6 LF, 6 F, 6 FS, 136/120; 423/562, 561; 429/194, 218, 199

[56] References Cited

U.S. PATENT DOCUMENTS

| | | | |
|---|---|---|---|
| 3,079,229 | 2/1963 | Garrett | 423/562 |
| 3,791,867 | 2/1974 | Broadhead et al. | 136/20 X |
| 3,864,167 | 2/1975 | Broadhead et al. | 136/20 X |

OTHER PUBLICATIONS

Chem. Abs. vol. 53, pp. 5936–5937, The Sulfides, Selenides, and Tellurides of Titanium, Zirconium, Hafnium and Thiobium.

*Primary Examiner*—Charles F. LeFevour
*Attorney, Agent, or Firm*—M. A. Ciomek; K. P. Glynn

[57] ABSTRACT

Stoichiometric titanium disulfide having a high degree of crystalline perfection and particularly suited for use as an active cathode material is prepared by heating particulate metallic titanium to a reaction temperature between about 475° and 600° C., contacting the heated titanium with an atmosphere having a sulfur partial pressure substantially equal to the equilibrium sulfur partial pressure at the reaction temperature to form titanium disulfide, and maintaining the reactants at the reaction temperature sufficiently to insure complete reaction. A battery is described which employs a lithium anode, an electrolyte of lithium perchlorate dissolved in an organic solvent and stoichiometric titanium disulfide having a single hexagonal phase and a particle size surface area between about 2 and 4 square meters per gram.

3 Claims, 2 Drawing Figures

RECHARGEABLE ELECTROCHEMICAL CELL WITH CATHODE OF STOICHIOMETRIC TITANIUM DISULFIDE

This is a division of application Ser. No. 575,994, filed May 9, 1975, now U.S. Pat. No. 4,007,055.

BACKGROUND OF THE INVENTION

The present invention relates to the preparation of titanium disulfide and more particularly to the production of stoichiometric titanium sulfide having a high degree of crystalline perfection and a controlled particle size by directly reacting metallic titanium and elemental sulfur.

Recent work has shown that the dichalcogenides of titanium, zirconium, hafnium, vanadium, niobium, tantalum, molybdenum, tungsten, technetium, rhenium, platinum, germanium, tin and lead can be intercalated by Group Ia elements, Group Ib elements, Group IIa elements, Group IIb elements, ammonia (or substituted ammonium compounds), aluminum, gallium, indium and thallium to produce a new class of materials that have very interesting properties that make them useful as lubricants, X-ray diffraction grating crystals, superconductors and thermoelectric elements. A potentially important commercial use for some of these materials is as active cathode materials in secondary batteries.

Titanium disulfide, in particular, has many properties that make it highly attractive as an active cathode material in secondary batteries. The one property makes titanium disulfide particularly useful as an active cathode material is that certain ions and molecules, such as lithium and ammonia, display high mobilities through titanium disulfide. These high mobilities allow titanium disulfide to be rapidly intercalated and provide high current densities when titanium disulfide is used as an active cathode material in an electrochemical cell. The high mobilities of ions and molecules in titanium disulfide, however, are not inherent properties but are dependent upon the composition of the titanium disulfide as well as its crystalline perfection. Titanium disulfide has a cadmium iodide structure with one layer per unit cell and with the sulfur being octahedrally coordinated about the titanium. Separate dichalcogenide layers are bound by van der Waals forces. Crystal imperfections due to growth conditions or to high metal concentrations result in interstitial titanium between the sulfur layers. Interstitial titanium drastically lowers the mobilities of ions and molecules and renders the titanium disulfide less desirable as a cathode material. It is thus highly advantageous to control the preparation of titanium disulfide to insure that the compound is stoichiometric and that crystal imperfections are minimized.

When transition metal dichalcogenides are used as active cathode materials in secondary batteries, the dichalcogenide is in the charged state when it is unintercalated. As the battery is discharged, the dichalcogenide is intercalated. The rate of intercalation of the dichalcogenide is a limiting factor of the current density that a battery can develop over prolonged periods without significant polarization occurring. Premature high polarization can prevent full utilization of the battery's theoretical capacity. Intercalation of the dichalcogenides is a diffusion process parallel to the basal planes of the hexagonal dichalcogenides. Large basal planes present greater diffusion distances which in turn results in lower battery discharge rates. When the transition metal dichalcogenides are to be used as active cathode materials, it is therefore highly advantageous that they be prepared in a manner that insures the production of crystallites with small aspect ratios, i.e., the ratio of the basal plane axis to the vertical axis. It should be noted that the lubricating properties of the dichalcogenides effectively eliminates comminution as a method for controlling particle size.

Titanium disulfide has been prepared by at least three methods. In one method titanium trisulfide is heated to a temperature of about 600° C. to disproportionate the trisulfide to titanium disulfide and sulfur. High temperature disproportionation is difficult to control and produces titanium disulfide with substantial crystalline imperfections. Another process for preparing titanium disulfide is to react titanium tetrachloride with hydrogen sulfide to form titanium disulfide and hydrogen chloride. Titanium disulfide formed by the reaction of titanium tetrachloride and hydrogen sulfide contains substantial amounts of chlorine, i.e., up to 2 percent chlorine, which materially lowers the reversibility of the battery system due to chlorine contamination of the anode metal, e.g., lithium. Titanium disulfide has also been prepared by directly reacting titanium metal with elemental sulfur at temperatures in excess of 600° C. The use of temperatures in excess of 600° C. introduces a substantial number of crystal imperfections in the resulting titanium disulfide and results in a product having undesirably large average particle size and aspect ratio.

SUMMARY OF THE INVENTION

Generally speaking, the present invention involves the preparation of fine particulate stoichiometric titanium disulfide having minimal crystalline imperfections and having small aspect ratios by heating particulate metallic titanium to a reaction temperature between about 475° and 600° C. and contacting the heated titanium with an atmosphere having a sulfur partial pressure substantially equal to the equilibrium sulfur partial pressure over titanium disulfide at the reaction temperature for a period of time sufficient to insure substantially complete reaction between the titanium and the sulfur.

DETAILED DESCRIPTION

Figure 1:
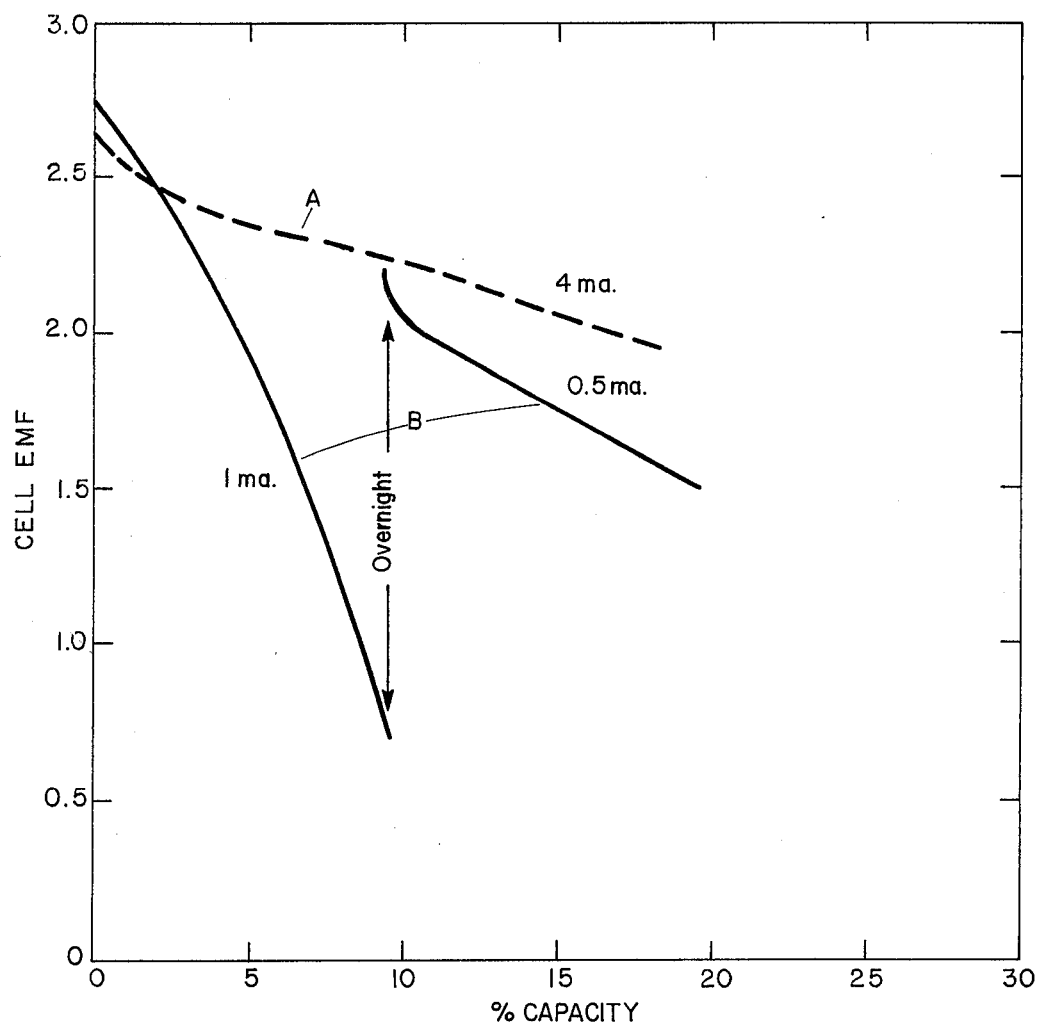
FIG. 1 is a graph showing the relationship of cell potential on discharge versus cathode capacity for two cells — Curve A is for a cell having stoichiometric titanium disulfide as a cathode material, and Curve B is for non-stoichiometric material.

In carrying the present invention into practice, particulate titanium metal and substantially stoichiometric amounts of elemental sulfur are placed in an elongated reaction vessel. Alternatively, the reaction vessel can consist of two interconnected parts which contain respectively the titanium and the sulfur. The reaction vessel is then evacuated and sealed. The reaction vessel is differentially heated to establish a hot zone that contains the titanium and a cooler zone in which sulfur can condense. Differential heating is conducted so that the hot zone is between about 50° and 300° C. hotter than the cooler zone. Whether a single evacuated tube containing the controlled amounts of sulfur and titanium is differentially heated or two vessels are utilized, the sulfur partial pressure over the heated titanium is controlled by either the temperature of the cooler zone or by the temperature of the vessel containing the sulfur to equal substantially the equilibrium sulfur partial pressure over titanium disulfide. The hot zone is heated to a reaction temperature between about 475° and 600° C. at which temperature the reaction vessel is held for a time sufficient to insure substantially complete reaction between the titanium and the sulfur.

Although particulate titanium having wide particle size distribution ranges can be used as feed material, it is advantageous to use particulate titanium, e.g., titanium sponge, having a particle size distribution range between about 100% minus 4 mesh and 100% plus 40 mesh, TSS. The use of titanium metal having particle size in excess of plus 4 mesh results in uneconomically slow reaction rates, while the use of titanium having a particle size much below minus 40 mesh produces uncontrollable reaction rates that can cause localized overheating which in turn can induce crystalline imperfections in the product and/or induces a coarsening of the particle size of the product. Finer particulation titanium, because of its greater surface area and reactivity, can be the source of undesirable contamination. From the standpoint of reaction control and product purity, it is advantageous to use titanium sponge within the size range of 100% minus 4 mesh and 100% plus 40 mesh.

As noted hereinbefore, the titanium sponge is heated to a temperature between about 475° and 600° C. to directly react particulate titanium metal with elemental sulfur. Advantageously, the direct reaction is conducted at a temperature of between about 500° and 550° C. Titanium disulfide produced with the foregoing temperature ranges is stoichiometric, has a uniform small particle size which is characterized by a surface area of approximately 2 meters$^2$/gm to about 4 meters$^2$/gm, and has minimal crystalline imperfections. Lower reaction temperatures are also advantageous in terms of equipment and control. At temperatures between 500° C. and 550° C., the equilibrium sulfur partial pressure over titanium disulfide increases from less than about 0.25 atmosphere to about only 0.55 atmosphere, which pressures are readily generated and maintained in existing equipment. Above 550° C., particularly above 600° C., much higher sulfur partial pressures must be generated and maintained which pressures can require specially designed apparatus and can cause control problems in minimizing crystal growth or the production of titanium trisulfide. Within the preferred temperature range, stoichiometric titanium disulfide is formed at commercially attractive rates and in a form that is particularly useful as a cathode material in secondary batteries.

An important aspect of the present invention is the amounts of titanium and sulfur that are reacted. Titanium and sulfur should be used in substantially stoichiometric amounts in order to insure that stoichiometric titanium disulfide is formed. The importance of titanium disulfide stoichiometry is illustrated in FIG. 1 which compares the discharge rates of two cells in which one cell had low surface area, stoichiometric titanium disulfide, Curve A, as its active cathode material; and the other had a low surface area, titanium-rich disulfide ($Ti_{1.1}S_2$), Curve B, as its active cathode material. The capacity of the cells is cathode limited and is calculated on the basis of the following reaction:

$$TiS_2 + Li \rightleftarrows LiTiS_2$$

Both cells were identically constructed, except for the cathode material, and had cathode areas of 2 square centimeter (cm$^2$), lithium anodes on both sides of the cathode, and an electrolyte of lithium perchlorate in 70% tetrahydrofuran and 30% dimethoxyethane. The cell with the stoichiometric titanium disulfide cathode was dicharged at a rate of 4 milliamps (ma) while the other cell was discharged at a rate of 1 ma and allowed to depolarize itself overnight before discharging at a rate of 0.5 ma was resumed. It is evident that even at far higher discharge rates the cell having the stoichiometric titanium disulfide cathode was far more efficient and that stoichiometric titanium disulfide can be discharged at far higher rates than can cells having non-stoichiometric cathode materials for a given polarization loss. The results presented in FIG. 1 confirm the importance of maintaining stoichiometry in the titanium disulfide when it is to be used as active cathode material in batteries. A slight excess of sulfur can be used in order to minimize the formation of titanium-rich disulfide but then the sulfur partial pressure must be controlled carefully by controlling the temperature of the sulfur so that titanium trisulfide is not formed during the reaction or during cooling. Excessive amounts of sulfur should be avoided because sulfur can act as a transport agent and can promote undesirable crystal growth.

Temperature control in the preparation of titanium disulfide for use as cathode material is highly important. Low reaction temperatures result in a process that is too slow to have any commercial significance. Reaction temperatures above 600° C. are undesirable for numerous reasons. At temperatures above 625° C., excessive amounts of sulfur must be employed in order to maintain sulfur partial pressures sufficiently high to minimize the disproportionation of previously formed titanium disulfide. The required excess of sulfur can act as a transport agent and the higher temperature will promote such transport reactions. The combination of excessive sulfur acting as a transport agent and the higher temperatures promoting the transport reactions produces titanium disulfide having a large particle size which is undesirable in battery applications.

Increased thermal energies at temperatures in excess of 700° C. increase the number and the mobility of crystalline imperfections, and the likelihood of titanium atoms occupying positions between the sulfur layers held together by van der Waals' forces increase dramatically with increasing temperatures. Titanium between the sulfur layers, which, even if the overall composition is stoichiometric, reduces drastically rates of intercalation, and therefore when titanium disulfide prepared at such high temperatures is used as a cathode in a battery low battery discharge rates are realized.

Figure 2:
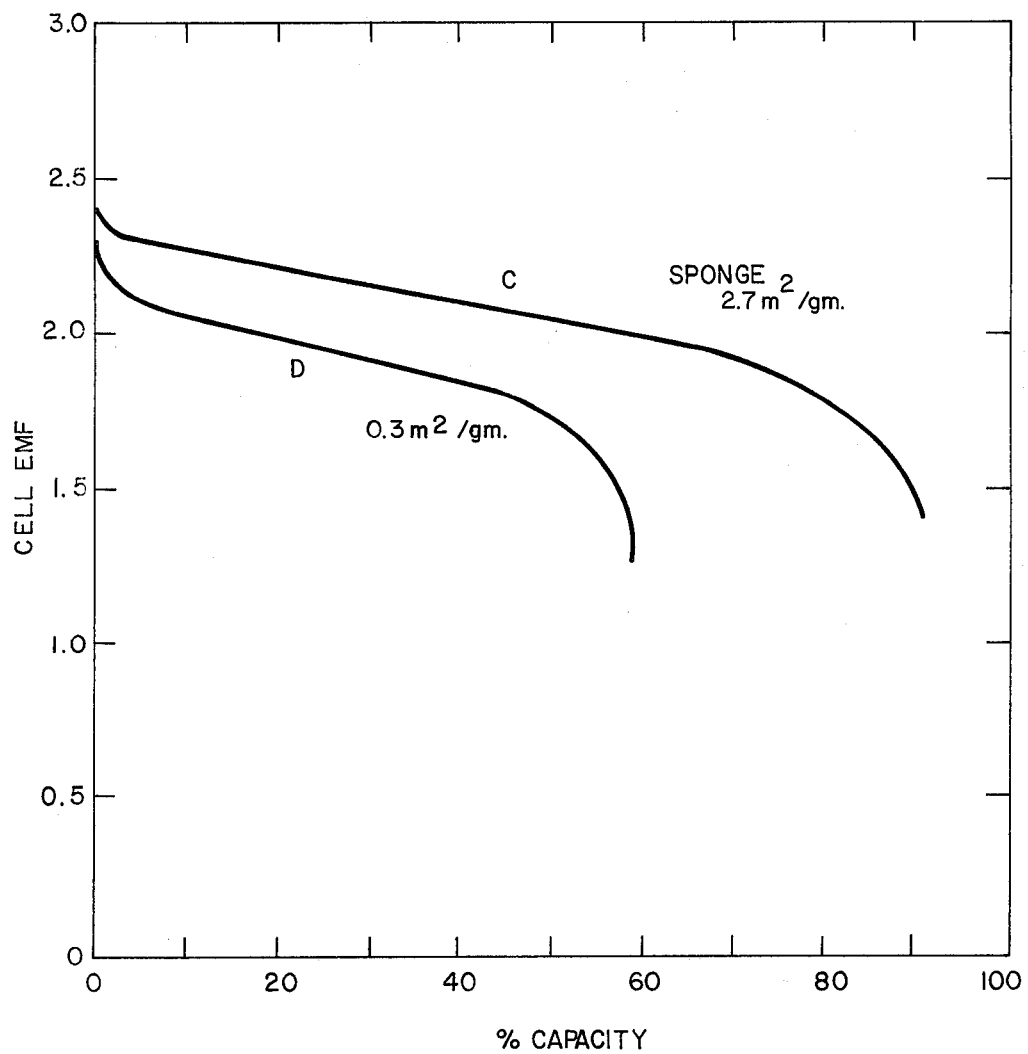
FIG. 2 shows the same relationship as FIG. 1, except that FIG. 2 shows the efficiencies of a cathode made of a finely divided titanium disulfide material (Curve C) prepared as described herein and a cathode made of coarse platelike titanium disulfide prepared at a higher temperature but still stoichiometric.

High reaction temperatures also promote crystal growth, particularly of the basal planes, which is not desirable when the disulfide is to be used as a cathode active material. FIG. 2 shows that titanium disulfide having a smaller crystal size and smaller aspect ratio, as evidenced by a larger surface area and electron microscope observation, allows for greater battery discharge for a given polarization potential. Two cathodes of stoichiometric titanium disulfide — one made of titanium disulfide, prepared as described herein, having a surface area of 2.7 square meters per gram (m²/gm), Curve C, and the other of TiS₂ having a surface area of 0.3 m²/gm, Curve D, were tested in identical cells with anodes of lithium metal and electrolytes containing lithium perchlorate dissolved in dioxolane. It is clear that for a given polarization potential, cathodes made of finely divided titanium disulfide (Curve C) can be three times or more as efficient as cathodes made of coarse platelet titanium disulfide (Curve D), prepared at higher temperatures.

The foregoing discussion demonstrates the importance of controlling the reaction temperature between about 475° and 600° C. Advantageously, the reaction temperature is controlled between about 500° and 550° C. to insure commercially attractive production rates, ease of reaction control and a product that has properties that make it highly useful as a cathode material. Temperature control is best exercised by differentially heating an elongated reaction vessel that contains the titanium and the sulfur. Differential heating is conducted by heating that portion of the vessel containing titanium to the reaction temperature and maintaining another portion of the vessel at a temperature between about 50° and 300° C. below the temperature of the titanium. Vaporous sulfur condenses in the cooler portion of the reaction vessel and the sulfur partial pressure in the entire reaction vessel is thereby controlled. Control of the sulfur partial pressure over the titanium in this manner moderates the rate of reaction and minimizes localized overheating thereby avoiding the problems encountered with the high temperature production of titanium disulfide. This control of the sulfur partial pressure also prevents the formation of titanium trisulfide.

Reaction rates can also be moderated by gradually heating the titanium from 350° C. to the reaction temperature. Heating rates between about 10° and 100° C. per hour (° C/hr) are advantageously employed. Gradual heating controls the amount of sulfur vapor that initially reacts with the particulate titanium to produce a reaction moderating surface film of titanium sulfide. Once this film is formed, higher temperatures and sulfur partial pressures can be used without the reaction becoming explosive. The rate of reaction can also be controlled by maintaining a temperature gradient such that a part of the sulfur remains solid during the initial stages of reaction. This can be accomplished for example by allowing a part of the reaction vessel to be initially external to the furnace; as the reaction proceeds the vessel is slowly inserted further into the furnace. In this manner the titanium is contacted incrementally with sulfur. Alternatively, the metallic titanium can be pre-sulfided to provide a reaction moderating surface film of titanium sulfide, and gradually heating to the reaction temperature from 350° C. is not as critical.

When separate but interconnected vessels for holding the titanium and the sulfur, respectively, are employed, the temperature of the separate vessels can be independently controlled to great advantage. For example, the titanium can be heated to 350° C. and initially reacted with controlled amounts of sulfur by heating the sulfur-containing vessel to about 300° to form a reaction moderating film and then the titanium-containing vessel can be heated to the reaction temperature while the temperature of the sulfur-containing vessel is heated to such a temperature as to provide a sulfur partial pressure above the titanium that is substantially equal to the equilibrium sulfur partial pressure of titanium disulfide at the reaction temperature.

After the titanium is brought to the reaction temperature, the titanium is held at that temperature long enough to allow the sulfur to react with substantially all of the unreacted titanium. The reaction zone of the reaction vessel is held at the reaction temperature for at least about 1 hour and advantageously at least about 6 hours to insure substantially complete reaction. When the reaction is complete, the titanium disulfide is cooled rapidly to ambient temperature to minimize the production of titanium trisulfide which is increasingly stable at temperatures below about 550° C.

Although the process in accordance with the present invention has been described in terms of a batch process, those skilled in the art will recognize immediately that the process can be conducted on a continuous basis. For example, titanium sponge can be heated to 350° C. in an air-free (preferably subatmospheric) preheating zone. During preheating, the titanium sponge is also degassed. The preheated titanium sponge is conveyed to a first reaction zone which is maintained at a temperature between about 350° C. and 450° C. and in which a sulfur partial pressure of between about 0.01 and 0.05 atmosphere is established. After a reaction moderating surface film of titanium sulfide is formed on the titanium sponge, the titanium sponge is conveyed to a second reaction zone which is maintained at a temperature between about 475° and 600° C. and in which the sulfur partial pressure is maintained between about 0.1 and 0.75 atmosphere with the proviso that the sulfur partial pressure is substantially equal to the equilibrium sulfur partial pressure over titanium disulfide at the temperature at which the second reaction zone is maintained. When the titanium sponge is completely reacted in the second reaction zone to produce stoichiometric titanium disulfide, the titanium disulfide is conveyed to a cooling zone in which an inert atmosphere is maintained.

In order to give those skilled in the art a better appreciation of the present invention, the following illustrative examples are given:

EXAMPLE 1

22.46 gm of titanium sponge and 30.08 gm of sulfur powder were sealed in a Vycor glass tube (13½ inches long × 1½ inches diameter). The hot end of the tube, where the titanium was placed, was raised to 450° C. over 6 hours, and the cold end to 260° C., where they were maintained for approximately 15 hours. The hot end was then raised to about 515° C. for 4 hours where it remained for 26 hours; over this period the cold end was allowed to rise to 360° C. The furnace was then turned off. The surface area of the golden yellow powder formed was 2.84 m²/gm. Analysis of the product by complete oxidation to $TiO_2$ showed that the product had a composition corresponding to $Ti_{1.001}S_2$ with an accuracy of ±0.003 for the titanium. X-ray analysis confirmed the presence of a single phase with hexagonal parameters of $a_o = 3.410A$ and $c_o = 5.698A$.

EXAMPLE 2

22.41 gm of titanium sponge and 30.0 gm of sulfur powder were placed in a Vycor tube (14 inches long × 1½ inches diameter) and heated over 1½ hour to 400° C. and then over the next 2¼ hours to 510° C.; over this period, the cold end of the tube was raised to 250° C. The tube was held at these temperatures for 21 hours, and then cooled. Yellow titanium disulfide had been formed. A further anneal at 523°/338° for 16 hours was then performed, after which the area of the material was 2.54 m²/gm. Analysis of the product by complete oxidation to $TiO_2$ showed that the product had a composition corresponding to $Ti_{1.002}$ with an accuracy of ±0.003 for the titanium. X-ray analysis confirmed the presence of a single phase with hexagonal parameters of $a_o = 3.408$A and $c_o = 5.698$A.

EXAMPLE 3

42.98 gm of titanium sponge and 57.55 gm of sulfur were sealed in a Vycor glass tube (16¼ inches long × 1⅝ inches diameter). The end of the tube containing the titanium was heated to 380° C. and the cold end to about 200° C. over 4 hours, which temperatures were maintained for 14 hours. The hot end was then raised to 500° C. over 8 hours, the cold end being maintained between 260° and 300° C. during this period. These temperatures were essentially maintained for 36 hours, the hot and cold ends not exceeding 525° and 360° C., respectively. The surface area of this material was found to be 3.18 m²/gm. Analysis of the product by complete oxidation to $TiO_2$ showed that the product had a composition corresponding to $Ti_{1.004}S_2$ with an accuracy of ±0.003 for the titanium. X-ray analysis confirmed the presence of a single phase with hexagonal parameters of $a_o = 3.408$A and $c_o = 5.696$A.

EXAMPLE 4

4.79 gm of titanium sponge, which passed a 20 mesh sieve but not a 30 mesh sieve, and 6.41 gm of sulfur powder were sealed in a quartz tube (12 inches long × 13/16 inch diameter). This tube was heated to 265° C. hot end, 92° C. cold end, over 1 hour, held there for 2¼ hours, and then heated to 400° C./110° C. over the next 1½ hours. It was held constant for 12 hours and then heated to 505° C./260° C. over 8 hours, where the tube was held for 18 hours. It was then heated at 520° C./330° C. for 4 hours, at which point it was cooled; the cold end of the tube was pushed out of the furnace to quench it to room temperature at the beginning of the cool. The surface area of this sample was 2.52 m²/gm. Analysis of the product by complete oxidation to $TiO_2$ showed that the product had a composition corresponding to $Ti_{1.00}S_2$ with an accuracy of ±0.003 for the titanium. X-ray analysis confirmed the presence of a single phase with hexagonal parameters of $a_c = 3.406$A and $c_o = 5.698$A.

EXAMPLE 5

Titanium disulfide was prepared under identical conditions as in Example 4, except that different mesh size titanium sponge was used. Samples which passed a 4 mesh but not a 10 had a surface area of 2.72 m²/gm, a 10 but not a 20 an area of 2.60 m²/gm, a 20 but not a 30 an area of 2.58 m²/gm, and a 30 but not a 40 mesh 2.76 m²/gm. X-ray analysis showed that each of the samples was composed of a single hexagonal phase that had lattice parameters of $a_o = 3.410$A and $c_o = 5.700$A; $a_o = 3.408$A and $c_o = 5.700$A; $a_o = 3.406$A and $co = 5.700$A; and $a_c = 3.402$A and $c_o = 5.698$A, respectively.

What is claimed is:

1. A rechargeable electrochemical cell, comprising:
   (a) a lithium metal anode;
   (b) an electrolyte containing lithium perchlorate dissolved in an organic solvent; and
   (c) a cathode made of substantially stoichiometric titanium disulfide active cathode material having a single hexagonal phase and a uniform particle size characterized by a surface area between about 2 and about 4 square meters per gram.

2. The rechargeable electrochemical cell of claim 1, wherein the titanium disulfide is an active cathode material prepared by heating particulate titanium to a reaction temperature of between about 475° C. and about 600° C. and contacting the heated titanium with an atmosphere having a sulfur partial pressure substantially equal to the equilibrium sulfur partial pressure over titanium disulfide at the reaction temperature to form titanium disulfide, said titanium and sulfur being used in substantially stoichiometric amounts, and holding the heated titanium at the reaction temperature to homogenize the titanium disulfide.

3. The rechargeable electrochemical cell of claim 2 wherein said particulate titanium has a particle size distribution range between about 100% minus 4 mesh and about 100% plus 40 mesh wherein the heated titanium is contacted incrementally with sulfur to minimize temperature increases above the reaction temperature.

* * * * *